May 11, 1926.  
H. G. SHOCKLEY  
1,584,666  
TIDAL CONDUIT SYSTEM FOR SEWERAGE  
Filed April 29, 1924
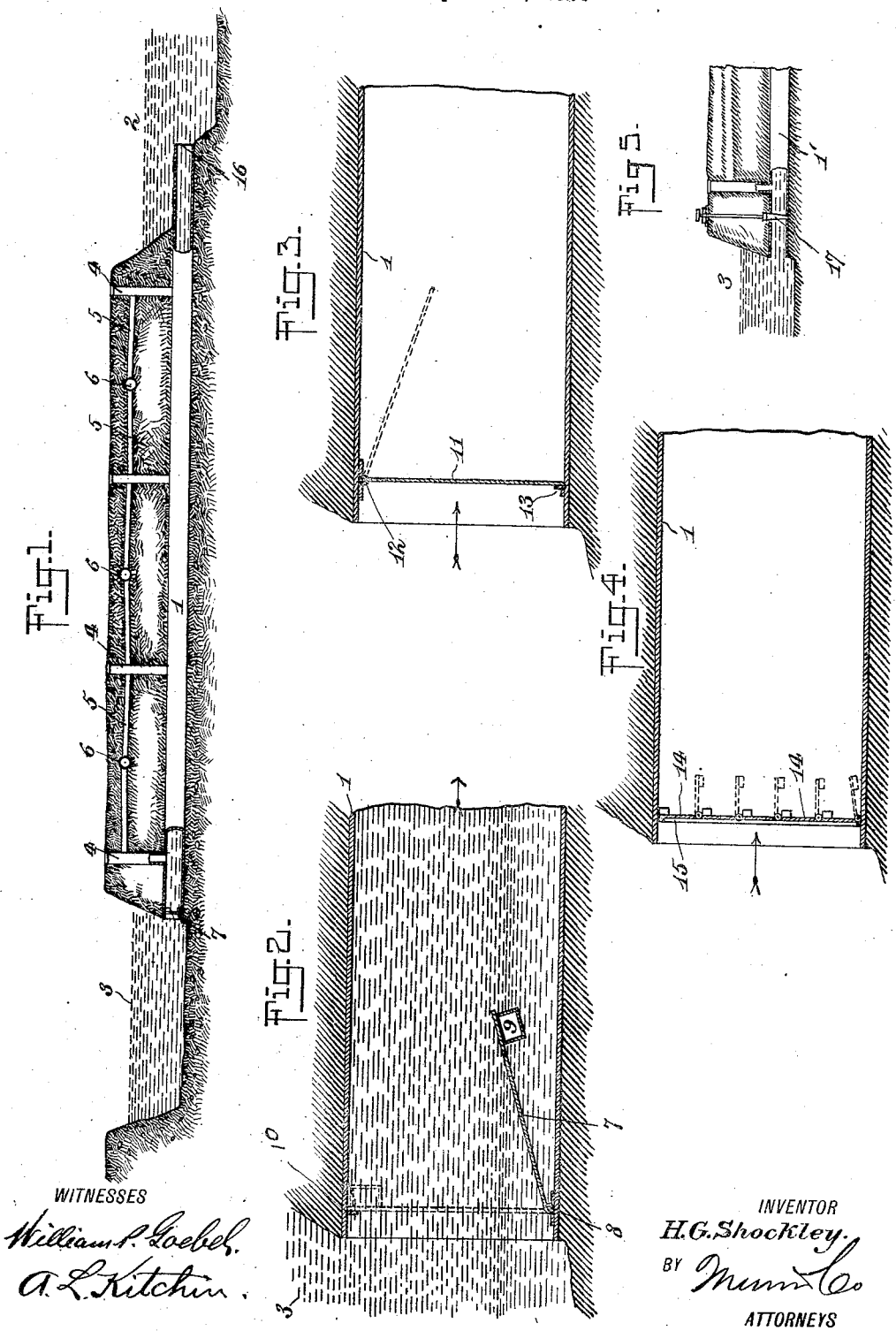
WITNESSES  
William P. Goebel  
A. L. Kitchin
INVENTOR  
H. G. Shockley  
BY Munn & Co  
ATTORNEYS Patented May 11, 1926.

UNITED STATES PATENT OFFICE.

1,584,666

HOMER G. SHOCKLEY, OF NEW YORK, N. Y.

TIDAL CONDUIT SYSTEM FOR SEWERAGE.

Application filed April 29, 1924. Serial No. 709,919.

This invention relates to a sewerage disposal system and has for an object to provide an improved construction wherein the rising and falling of the tide of the ocean controls the discharge of the sewerage automatically.

Another object of the invention is to provide an improved sewerage disposal system wherein means are provided for collecting sewerage and then automatically discharging the same into the ocean on the outgoing of the tide.

In the accompanying drawing—

Figure 1 is a sectional view through the ground near the ocean showing a sewerage system disclosing an embodiment of the invention.

Figure 2 is a longitudinal vertical sectional view on an enlarged scale showing one end of the system illustrated in Figure 1.

Figure 3 is a view similar to Figure 2 but showing a slightly modified construction of tide gate.

Figure 4 is a view similar to Figure 2 but showing a modified form of tide gate.

Figure 5 is a detail fragmentary sectional view similar to Figure 1 near the right-hand end, said figure, however, showing a modified construction including a manually actuated gate.

Referring to the accompanying drawing by numerals, 1 may be termed a reservoir or sewerage collecting conduit, said reservoir or conduit opening into the ocean 2 at one end and to an inlet or bay 3 at the opposite end. This reservoir or conduit may be any desired length, as for instance, three thousand feet long or several miles long, according to the needs of the community and the contour of the surrounding country.

In disposing of the sewerage of cities or large towns located near the ocean or bays, it has been customary to discharge the sewerage as far down the bay or harbor as possible and then depend on the tide to remove the same into the ocean. This will gradually take place but before it does, the sewerage will merely surge back and forth and at each surge will gradually work its way out. In order to avoid this condition and also avoid continually discharging sewerage into the ocean near the town, the reservoir 1 in the accompanying drawing has been arranged at a convenient point so as to connect the ocean with an inlet and has been positioned below the low tide line of the ocean and inlet. Suitable vertical passage-ways 4 commonly known as manholes are provided and connected to the reservoir 1. To the manholes 4, the pipes 5 of the system are connected, said pipes draining from the various main sewerage pipes 6 which in turn receive their sewerage either directly or indirectly from the houses, factories and the like of the city. Arranged at the inlet end of the reservoir 1, is a tide gate 7 which may be constructed in different ways but which is intended to close as soon as the tide starts to come in. The gate 7 as shown in Figure 2 is pivotally mounted at 8 and carries a float 9 which may be a hollow body or any suitable float and which will cause the gate to gradually move upwardly to a closed position against the stop 10 as the tide rises. If preferred, the tide gate 11 shown in Figure 3 can be used. This gate is hinged at 12 near the upper part of the reservoir 1 and automatically swings downwardly under the action of gravity when the tide turns and starts to come in. A suitable stop 13 limits the inward swinging movement.

In Figure 4, a further modified form of gate is shown wherein a plurality of separate gate members 14 are pivotally mounted on a suitable frame 15 and successively close from the bottom upwardly as the tide moves in. These members also successively open from the top downwardly when the tide move outwardly while the gates 7 and 11 automatically swing outwardly as the tide moves out. As is well known, when the tide in the ocean is coming in, it will reach the high tide line before the inlet 3 will reach the high tide line. The reverse is also true, the tide in the ocean will begin to go down and will move down an appreciable distance before the water in the inlet 3 begins to move down. By reason of this difference in level therewill be automatically a flow of water either from the inlet 3 or from the ocean 2 through the reservoir 1. By reason of the tide gate 7 there will be but little inward flowing of water from the ocean as the gate will almost immediately close as soon as the pressure begins to be felt in that direction. However, when the pressure is felt in the opposite direction, the gate will immediately swing inwardly and as the pressure increases the gate will open wider and wider whereby there will be an appreciable flow of water from inlet 3 directly to the ocean and will wash out of the reservoir 1 all sewerage so that this sewerage will be discharged into the ocean on the outgoing tide and will be carried by said tide a long distance out before the tide turns.

During the use of the system, after it has once been started, the sewerage will flow into the reservoir 1 and will gradually displace the water therein which will gradually pass out through the outer or discharge end 16. It is intended to make the reservoir 1 sufficiently large to if possible, accommodate all the sewerage of the town so that there will be no discharge of sewerage between tides. After the sewerage has collected in the reservoir 1 and the tide begins to turn and go out, the water will flow from inlet 3 directly through the reservoir and wash the same clean while causing the sewerage to be carried a long distance out into the ocean. Clean water from the bay 3 will continue to flow outwardly through the reservoir 1 until the tide turns. As soon as the tide turns, gate 7 will automatically close. When this occurs the reservoir 1 is filled with clean water. The sewerage from the various manholes 4 is discharged into this clean water, which clean water is gradually displaced by the sewerage until the tide has come in and turned again whereupon the action is repeated. This alternate filling and washing out of the reservoir 1 automatically takes place continually.

The invention as illustrated in Figures 1 to 4, utilizes the flood or tide gate which permits an automatic operation but under some circumstances it might be undesirable to use this structure and when this is the case, one or more gates 17 is provided as shown in Figure 5, which gate is manually actuated. This gate may be of any desired structure and may be actuated in any desired manner either by the tide or force of water. Also, if preferred, a manually actuated gate may be provided at or near each end of the container 1'. When this form of the invention is used, the sewerage is allowed to enter the container 1 in the usual manner where it is held in place by the gates at the opposite end of the container 1' or in case of the use of only one gate, it is held against movement into the inlet or bay 3. When this form of the invention is used, the gate 17 is adapted to be opened at the proper time, namely, when the tide is going out whereupon the water from the inlet or bay 3 will quickly flow through the container 1' and force the sewerage into the ocean.

Under some circumstances, it might be desirable to utilize this system on a stream instead of in connection with the ocean and an inlet. When the invention is to be used adjacent a stream, the heading of the container 1' is arranged at any desired distance above the city or community which it is to serve and discharged at any point below the city or community. Where the device is used in this manner, all the gates could be eliminated if desired or the gate 17 could be used in order to discharge the sewerage at certain periods. It is also understood that other slight changes could be made without departing from the spirit of the invention provided means were supplied for receiving the sewerage and means for automatically or otherwise turning on a supply of water for washing out the container either continuously or at stated intervals.

What I claim is:

1. A tidal conduit system for sewerage, comprising a reservoir formed as a large pipe extending from the ocean to an inlet of the ocean, a comparatively long distance therefrom, sewerage pipes positioned to discharge into said reservoir, a gate at the end of the reservoir opposite that opening into the ocean, said gate being pivotally mounted so as to swing open as water passes through said reservoir in one direction, and a float for causing the gate to close when the water attempts to pass through the reservoir in the opposite direction.

2. The combination with the sewerage pipes of a city, of a disposal structure for discharging the sewerage into the ocean on the outgoing tide, said disposal structure comprising a pipe large in comparison to any of the pipes of said system, said pipe extending into the ocean at one end and opening into a bay of the ocean at the opposite end, said pipe being of comparatively great length and of a size to accommodate substantially all of the sewerage from said city which may be discharged between the rise and fall of the tide, and a tide gate arranged at the end of said pipe opposite the ocean whereby it will close as the tide rises and will open and remain open as the tide recedes.

HOMER G. SHOCKLEY.